Jan. 15, 1957　　　　　　　R. J. GRAY　　　　　　　2,777,716
SOCKET TYPE HOSE COUPLER WITH RECIPROCATING DETENT
Filed Oct. 11, 1949　　　　　　　　　　　　　　　2 Sheets-Sheet 2
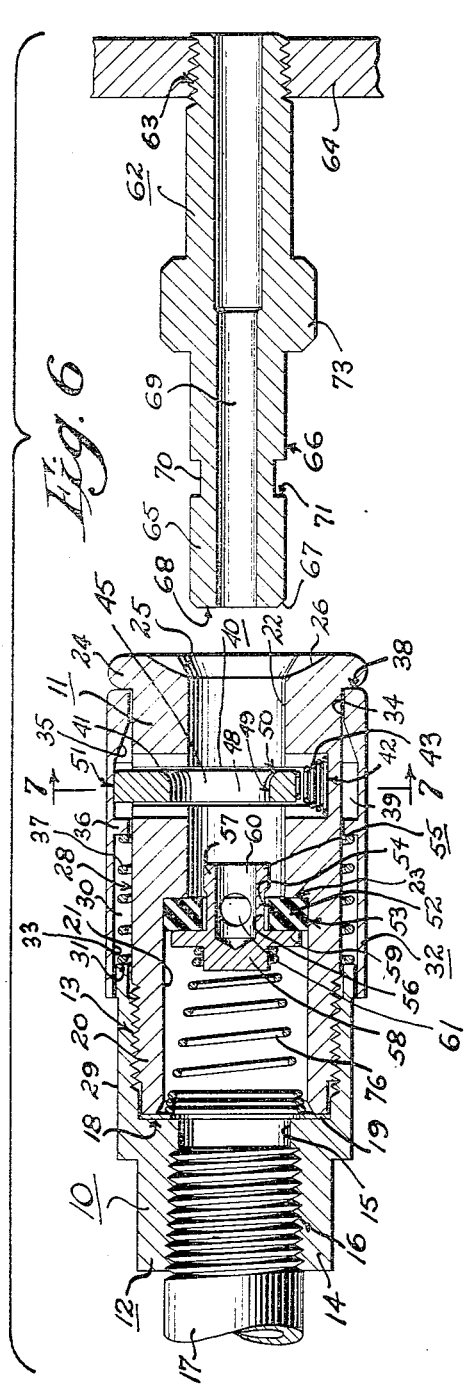
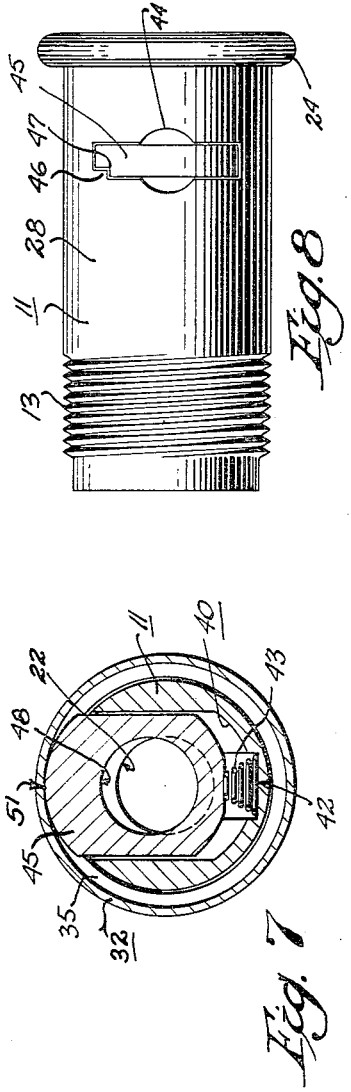
INVENTOR
*Russell J. Gray*
BY
*Leonard L. Kalish*
ATTORNEY

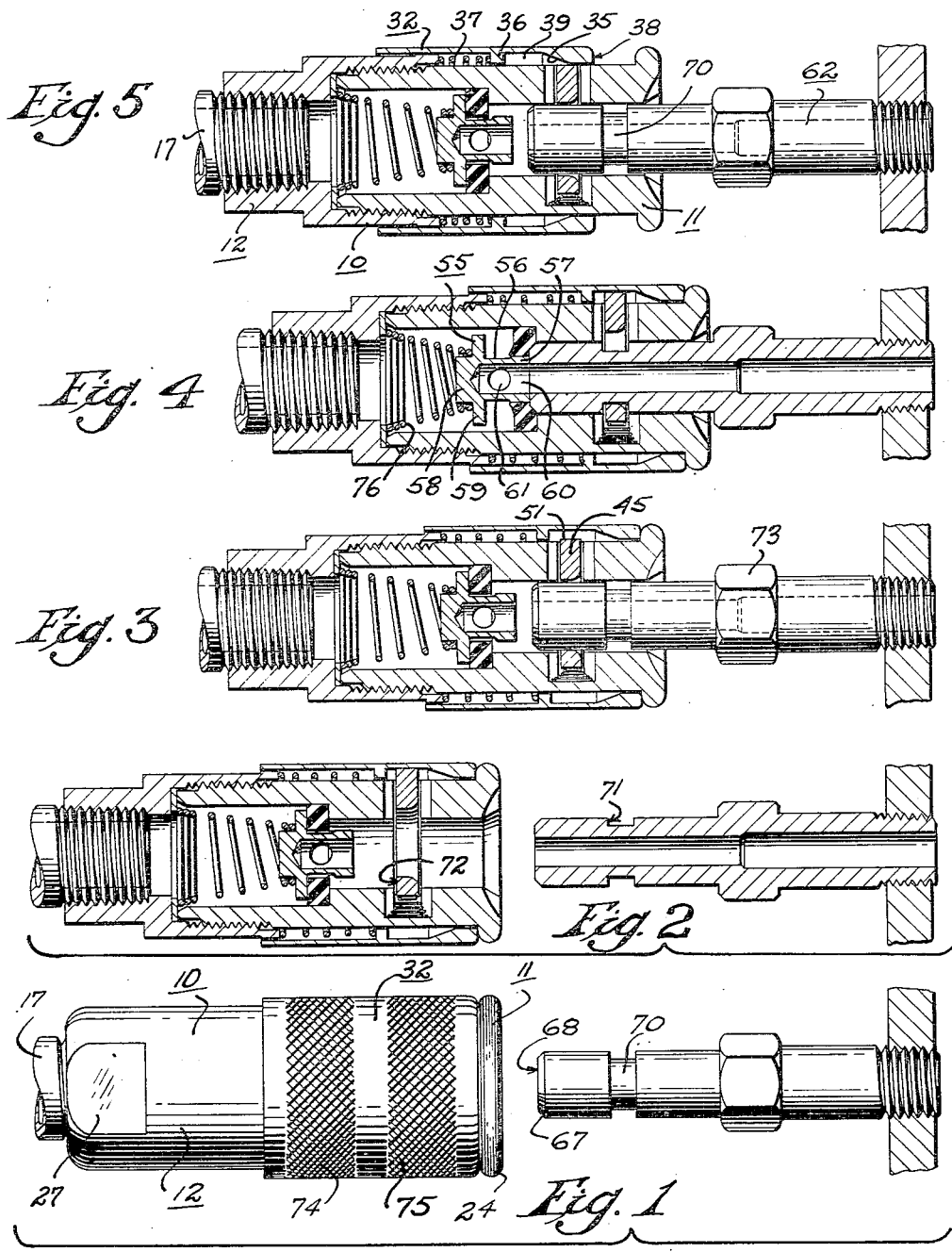

United States Patent Office 2,777,716
Patented Jan. 15, 1957

2,777,716

SOCKET TYPE HOSE COUPLER WITH RECIPROCATING DETENT

Russell J. Gray, Meadeville, Minn., assignor to Gray Company, Inc., Minneapolis, Minn., a corporation of Minnesota Application October 11, 1949, Serial No. 120,641

2 Claims. (Cl. 285—276)

The present invention relates to couplers, and particularly to quick-attachable and quick-detachable connectors for fluid-lines such as grease-hoses or air-hoses or the like.

The present invention relates more particularly to a quick-attachable and quick-detachable connector adapted for use on compressed air lines for securing a hose or similar conductor to a fitting or nipple adapted to receive compressed air.

A further object of the present invention is to provide a coupler which may be slipped upon a coupler-receiving fitting or nipple with a pushing or forward motion and which may be withdrawn easily from the fitting or nipple by a rearward or pulling motion upon the coupler, without any unscrewing or twisting or time-consuming operation; said coupler providing a positive lock between the telescoped coupler and fitting, and a fluid-tight and air-tight seal between the coupler and the fitting whereby to transmit compressed air or fluid under pressure from the conduit to which the coupler is fastened to the conduit to which the fitting or nipple is fastened.

Further objects and purposes will be apparent by reference to the specification, claims and appended drawings.

For the purpose of illustrating the invention, there is shown in the accompanying drawing one form thereof which is at present preferred, although it is to be understood that the various instrumentalities of which the invention consists can be variously arranged and organized and that the invention is not limited to the precise arrangements and organizations of the instrumentalities as herein shown and described.

Referring to the drawings wherein like reference characters indicate like parts:

Figure 1 represents an elevational view of the coupler and fitting of the present invention, with the coupler disposed in juxtaposition to the fitting, but prior to the inter-connection of said coupler and said fitting.

Figure 2 represents a vertical cross-sectional view of the coupler and fitting of the present invention, shown in the juxtaposed relationship heretofore described with respect to Figure 1.

Figure 3 represents a vertical cross-sectional view of the coupler and fitting of the present invention, with the coupler partially telescoped over the fitting.

Figure 4 represents a vertical cross-sectional view of the coupler and fitting of the present invention with the fitting interlocked with the coupler, and with the coupler and fitting in telescopic relation to each other.

Figure 5 represents a vertical cross-sectional view of the coupler and fitting of the present invention with the coupler partially withdrawn from engagement with the fitting.

Figure 6 represents an enlarged cross-sectional view, similar to that shown in Figure 2, better to reveal the structure of said invention.

Figure 7 represents a cross-sectional view along line 7—7 of Figure 6.

Figure 8 represents an elevational view of the front body-member of the coupler of the present invention, taken generally at right angles to the view shown in Figure 6, better to show the assembled relationship of the sliding latch or locking-key to the front body-member.

Referring particularly to Figures 1, 2 and 6, the coupler 10 of the present invention includes a generally tubular front body-member 11 and a generally tubular rear body-member 12 operatively secured to the body-member 11 as by the screw-threaded connection 13. The rear end 14 of the body-member 12 has a bore 15 therethrough, which may be internally threaded, as at 16, to receive the conduit 17. The conduit 17 may be any rigid or flexible pipe or tubing or hose or the like having a threaded connection adapted to engage the threads 16 and which is adapted to transmit fluid or gas under pressure to the bore 15 in the rear body-member 12. The threaded portion 13 of the body-member 12 is somewhat larger in diameter than the bore 15, with a transverse shoulder or abutment 18 therebetween. A gasket 19 disposed against the shoulder 18 provides a fluid-tight seal between the rear end 20 of the front body-member 11 and the shoulder 18 of the rear body-member 12.

The front body-member 11 has an internal chamber or passageway 21 near the rear end thereof which communicates with a smaller axial bore 22 extending forwardly through the body-member 11 to the front end thereof, with a transverse shoulder 23 between the bore 22 and the chamber 21. The front end of the body-member 11 has an annular shoulder or ridge 24 extending radially outwardly therefrom, and a chamfer or bevel 25 formed at the outer end of the bore 22. A plurality of notches or grooves 26 may be disposed around the chamfer 25, operatively to receive a tool (not shown) therein whereby to fasten the body-member 11 to the body-member 12. In like manner, flats or lands 27 may be formed on the outer surface of the body-member 12 so as to receive a complementary gripping tool (not shown) when fastening the body-member 11 to the body-member 12.

The external surface 28 of the body-member 11 is smaller in diameter than the external surface 29 of the body-member 12, forming a peripheral groove 30 between the surface 28, the annular ridge or rib 24 and the end 31 of the body-member 12. A sliding sleeve or shell 32 is disposed around the body portions 11 and 12, with an internal diameter 33 adapted slidingly to fit over the external diameter 29 of the body-member 12 and a smaller diametered portion 34 adapted slidingly to fit over the outer surface 28 of the body-member 11. Between the diameters 33 and 34, an inclined camming surface 35 is interposed, to the rear of which is a radially-inwardly extending shoulder-portion 36.

A compression spring 37 is interposed between the end 31 of the body-member 12 and the shoulder 36 of the shell or sleeve 32 so as to urge the sleeve 32 forwardly at all times. The forward end 38 of the sleeve 32 abuts the annular rib or ridge 24 of the body-member 11 when the shell 32 is in its forward position and limits the forward movement thereof.

Between the shoulder 36 and the inclined camming portion 35 of the shell 32, an internal annular groove 39 is formed, which is in juxtaposition to a transverse passageway 40 in the body-member 11 when the shell or sleeve 32 is in its forward position, as illustrated particularly in Figure 6.

The transverse guideway 40 is generally rectangular in cross-section and extends radially outwardly between the bore 22 and the annular groove 39.

Diametrically across the bore 22 from the slot or guideway 40 of a spring-seat or bearing surface 42 for a spring 43 is formed in the housing 11. A portion 44 of the transverse guideway 40 may be generally circular in shape to permit the compression spring 43 to be inserted therethrough. However, the transverse guideway 40 is generally rectangular in cross-section whereby to prevent rotation of the locking-key or latch 45. The circular portion 44 of the slot 40 may be eliminated if the spring 43 is shaped to fit within the rectangular guideway 40.

The guideway 40 has a shoulder-portion 46 formed along one corner thereof, operatively to engage a recess or groove 47 in the locking-key 45. The groove 47 and the shoulder-portion 46 of the passageway 40 provide a positive means of inserting the key 45 properly into the passageway 40 and admit of only one coacting sliding relationship between the passageway 40 and the key 45.

An aperture 48 in the locking-key 45 has an internal diameter 49 substantially the same size as the diameter of the bore 22. The forward or outer edge 50 of the aperture 48 may be beveled or chamfered, and will always face toward the outer end 25 of the bore 22 (rather than toward the chamber 21) because the key 46 can be inserted into the slot 47 in only one position.

The spring 43 urges the latch or locking-key 45 through the guideway 40, until the outer edge 51 of the key 45 strikes the shell 32 within the annular groove 39. In this position of the locking-member 45, the aperture 48 is out of alignment with the bore 22 in the body-member 11, as is shown particularly in Figure 7.

Within the chamber 21 in the body-member 11, and against the shoulder 23 thereof, is a sealing washer 52, preferably of synthetic rubber or the like. The gasket or washer 52 has an external diameter 53 which exceeds slightly the internal diameter of the chamber 21 so that the gasket 52 will be securely held within the chamber 21, against the shoulder 23.

Through an axial hole 54 in the gasket 52, a valve 55 is disposed. The valve 55 has a neck-portion 56 which is smaller than the diameter of the hole 54, but which has an enlarged shoulder-portion 57 at the forward or outer end thereof, generally the same diameter as the hole 54, or slightly less, so that the neck-portion 56, and particularly the enlarged end 57 thereof may slidingly fit within the hole 54 of the gasket 52. A shoulder-portion 58 and a cap-portion 59 are disposed on the rear side of the valve 55 with the shoulder 58 adapted to rest against the gasket 52. A spring 76, having one end thereof adapted to bear against the gasket 19 or the shoulder 18 and the other end fitting over the cap 59 and against the shoulder 58, urges the valve member 55 forwardly within the gasket 52 at all times.

An axial passageway 60 in the neck-portion 56 terminates short of the rear end of the valve 55 within the cap-portion 59. One or more ports 61, transverse to the axis of the passageway 60, and generally disposed in juxtaposition to the reduced shoulder-portion 56, are adapted to connect the passageway 60 with the external surface of the neck-portion 56 of the valve 55.

As is shown particularly in Figures 2, 3, 5 and 6, the spring 76 is adapted to urge the valve 55 forwardly against the gasket 52 so as to create an air-tight and fluid-tight seal therebetween and also to create an air-tight and fluid-tight seal between the chamber 21 and the bore 22 in the body-member 11. Thus, compressed air or other gases or fluid under pressure, transmitted through the conduit 17 and the bore 15 in the body-member 12 and through the chamber 21 in the body-member 11, is prevented from passing into the bore 22 by the valve member 55 in the gasket 52 against the shoulder-portion 23 in the body-member 11.

However, if the valve member 55 is moved rearwardly (with relation to the gasket 52), as is shown particularly in Figure 4, then the fluid under pressure or the compressed gases may pass from the chamber 21 through the ports 61 and the axial passageway 60 in the valve member 55 and out through the bore 22 in the body-member 11.

A fitting or nipple 62, adapted to engage a fluid-receiving chamber or conduit 64 (as by the threaded portion 63), has a peripherally grooved or headed portion 65 adapted to enter the bore 22 of the body-member 11. The outer diameter 66 of the headed portion 65 is slightly less than the internal diameter of the bore 22 so that there will be a free and sliding fit between the head 65 and the bore 22. A chamfer 67 at the foward end of the head 65 may contact the chamfer or bevel 25 at the forward end of the bore 22 to guide the head 65 into the bore 22. The head 65 is of sufficient axial length to permit the forward end 68 to pass through the bore 22 and engage the front end 60 of the valve 55, as is shown particularly in Figure 4. A continued axial movement of the fitting 62 into the bore 22 will lift the valve member 55 (and particularly the shoulder 58 thereof) from the gasket or seal 52 and expose the ports 61 on the rearward side of the gasket member 52. An axial bore 69 in the fitting or nipple 62 is adapted to be aligned with the axial passageway 60 in the valve member 55 when the fitting 62 and the valve member 55 are in contact, as is shown in Figure 4. In this position the compressed air or fluid may pass from the chamber 21 through the ports 61 and the axial passageway 60 into the axial bore 69 in the fitting 62.

As the forward end 68 and particularly the chamfer 67 on the head 65 of the fitting 62 enters the bore 22 in the body-member 11, the chamfer 67 contacts the beveled portion 50 of the aperture 48 in the locking-key 45. The camming action between the two beveled surfaces forces the locking-key 45 against the spring 43 and brings the aperture 48 into alignment with the bore 22, as shown particularly in Figure 3. Thus, the end 68 of the fitting 62 may pass through the bore 22 and contact the valve member 55.

A peripheral recess or annular groove 70 is disposed near the head 65 of the fitting 62, and is positioned therealong so as to be in registration with the locking-key 45 when the forward end 68 of the fitting 62 has moved the valve member 55 from the valve seat 52, as shown particularly in Figure 4. The annular recess or groove 70 has an axial length slightly in excess of the axial dimension of the locking-key 45 so that when the groove 70 is in registration with the locking-key 45, the spring 43 will urge the key through the transverse passageway 40 until the internal diameter 49 of the aperture 48 contacts the reduced diameter of the annular recess or groove 70. In this position the shoulder 71 between the groove 70 and the head 65 engages the shoulder 72 of the locking-key 45 and prevents the withdrawal of the fitting 62 from the bore 22. Thus, the coupler 10 and the fitting 62 are telescopically interlocked, with the valve 55 displaced from the gasket 52 so as to permit the transfer of fluid or gases through the coupler and the fitting. The forward edge 68 and the chamfer 67 of the headed end 65 contact the front surface of the gasket 52 when the locking-key 45 is secured in the annular groove 70 so as to provide a fluid-tight seal between the fitting 62 and the coupler 10.

When it is desired to disengage the coupler 10 from the fitting 62, the sleeve 32 is withdrawn rearwardly (against the compression spring 37) so as to bring the camming surface 35 against the outer edge 51 of the locking-member 45. This camming action urges the locking-key 45 against the spring 43 and brings the aperture 48 into alignment with the bore 22, as is shown particularly in Figure 5. With the aperture 48 and the bore 22 in alignment, the coupler and the fitting may be separated. After the coupler has been disengaged from the nipple or fitting, the sleeve 32 may be released and the spring 37 will urge the sleeve forwardly until the front end 38 thereof strikes the annular ridge or shoulder 24. In this position the coupler is again in readiness to be attached to another fitting 62. As the fitting 62 is withdrawn from the passageway 22, the spring 76 urges the valve member 55 forwardly against the gasket 52 to prevent the escape of any fluid or gas from the conduit 17. When the sleeve 32 is drawn rearwardly to align the aperture 48 and bore 22, with the coupler and fitting interlocked, the spring-urged valve 55, which is pressed constantly against the end 68 of the fitting, urges the fitting out of the passageway, and insures a disengagement of the annular groove 70 from the locking-key 45.

The operation of the present invention is as follows: with the coupler 10 grasped securely, either around the body portion 12 or the sleeve 32, the coupler 10 may be brought into axial juxtaposition with the fitting 62, as shown particularly in Figures 1 and 2. Then the bore 22 may be telescoped over the head 65 of the fitting 62 until the chamfer 67 contacts the camming portion 50 of the locking-key 45. A continued forward push on the coupler will force the locking-key 45 against the spring 43 and permit the fitting to move still further into the bore 22 until the forward edge 68 of the fitting contacts the valve 55 and unseats it from the gasket 52. Simultaneously with the unseating of valve 55, the annular groove 70 comes into juxtaposition with the locking-key 45 whereupon the spring 43 urges the locking-key into the groove 70 to prevent axial movement of the fitting with relation to the coupler. In this position fluid or gases may be transferred through the coupler and fitting.

When disengaging the fitting and the coupler, it is necessary only to draw back on the sleeve 32, whereupon the camming surface 35 urges the locking-key 45 against the spring 43 until the aperture 48 is in alignment with the bore 22. In this position the fitting 62 may be withdrawn from the bore 22, and the spring-urged valve 55 seals off the chamber 21.

The shoulder 46 in the guideway 40 and the groove 47 in the locking-key 45 permit only one way of assembling the key 45 into the guideway 40, and thus the camming surface 50 will always be facing toward the front end of the body member 11 so as to receive the chamfered portion 67 of the fitting 62 and provide the camming action heretofore described.

The annular groove 39 and the camming surface 35 of the sleeve member 32 may be completely circular in cross section so that the sleeve 32 is free to rotate upon the body members 11 and 12.

A shoulder portion 73 on the fitting member 62 is provided so that the fitting 62 may be threaded easily and securely into the chamber or conduit 64.

The outer surface of the sleeve member 32 may be knurled, as at 74 and 75 to provide a surface which may be gripped by the user of the coupler to assist in withdrawing the sleeve 32 against the compression spring 37.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention, what I claim as new and desire to protect by Letters Patent is the following:

1. A hose coupler for quick-attachable and quick-detachable connection with a bevel-ended nipple having a rearwardly facing coupler-engaging shoulder, said coupler comprising a generally tubular body member having an axial bore therethrough communicating with a rear end opening adapted to be connected to a hose and with a front end opening adapted telescopically to receive said nipple, a guideway formed in said body member transversely of said bore, a key slidable in said guideway having an opening defined by a margin and yieldably biased to a locking position seating said margin behind said shoulder when the nipple is inserted through said front end opening and the bevel-end thereof engages said margin so as slidably to displace the key, thereby to attach the body member to the nipple, and means for detaching the body member from the nipple comprising a sleeve surrounding the body member having a fixed camming surface extending radially outwardly from its front end portion, an internal groove behind said camming surface normally accommodating a portion of the key, and a spring biasing the sleeve to a position adjacent the front end of the body member, in which position of the sleeve the margin is disposed in locking position, whereby retracting said sleeve against said spring bias will cause the camming surface to engage the key and slide the same in said guideway so as to unseat said margin from behind said shoulder and simultaneously pull the body member off the nipple.

2. The combination claimed in claim 1, including a spring compressed beneath the inner end of the key and yieldably biasing it to locking position, and in which the camming surface fixed on the sleeve moves into sliding contact with the opposite, outer end of the key on retraction of the sleeve.

References Cited in the file of this patent

UNITED STATES PATENTS

| | | |
|---|---|---|
| 1,534,173 | Fogelberg | Apr. 21, 1925 |
| 1,565,349 | Zerk | Dec. 15, 1925 |
| 1,847,379 | Buchet | Mar. 1, 1932 |
| 2,108,866 | Mandl | Feb. 22, 1938 |
| 2,263,293 | Ewald | Nov. 18, 1941 |
| 2,425,500 | Wiggins | Aug. 12, 1947 |
| 2,503,495 | Koester | Apr. 11, 1950 |
| 2,521,701 | Earle | Sept. 12, 1950 |